United States Patent [19]

Sugimura et al.

[11] 4,287,916

[45] Sep. 8, 1981

[54] SEMISPHERICAL SHAPE VALVE DEVICE IN BLADDER TYPE ACCUMULATORS

[76] Inventors: Kazuo Sugimura; Nobuyuki Sugimura, both of 308, Mabase, Shimizu-shi, Shizuoka-ken, Japan

[21] Appl. No.: 87,701

[22] Filed: Oct. 24, 1979

[30] Foreign Application Priority Data

Sep. 5, 1978 [JP] Japan ............................... 53/108943

[51] Int. Cl.³ ............................................ F16L 55/04

[52] U.S. Cl. ....................................... 138/30; 251/359

[58] Field of Search .................. 138/26, 30; 220/85 B; 137/533, 539, 539.5; 251/61, 359

[56] References Cited

U.S. PATENT DOCUMENTS 3,158,180 11/1964 Greer .................................. 138/31

3,360,009 12/1967 Elmer .................................. 138/30

4,099,545 7/1978 Zahid .................................. 138/30

4,108,209 8/1978 Zahid .................................. 138/30

4,186,776 2/1980 Burton ................................ 138/30

*Primary Examiner*—James E. Bryant, III

*Attorney, Agent, or Firm*—Wegner, Stellman, McCord, Wood & Dalton

[57] ABSTRACT

Valve device of bladder type accumulators consisting of a pressure vessel with a bladder enclosed therein, a valve body is secured in the bottom free end of the bladder and a valve seat is formed in the top inside periphery of a liquid pipe, the opposing faces of said valve body and valve seat are so formed to mate closely to each other that when the bladder expands a part of the bladder will not be caught between the valve body and valve seat, thus it is protected from being damaged.

13 Claims, 4 Drawing Figures

SEMISPHERICAL SHAPE VALVE DEVICE IN BLADDER TYPE ACCUMULATORS

This invention relates to valve device in a bladder type accumulator in which a valve body is attached to the center of the bottom free end of the bladder.

The valve body in this bladder type accumulator is to seat on the seat formed in the top end of liquid pipe as the bladder expands so as to close snugly the top end opening of the liquid pipe thereby a part of the bladder will not protrude into the liquid pipe, thus it is protected from being locally damaged.

In the use of the accumulator, the bladder expands or contracts according to the pressure variation of liquid. In this instance, if the pressure variation of liquid is too fast or abrupt, the lower free end of the bladder tends to make random swinging. As a result, the tapered or cone shape valve body comes to seat in an eccentric position to the tapered or cone shape valve seat formed in the top inside periphery of the liquid pipe whereupon a gap is produced between the valve body and valve seat into which a part of the expanded bladder might be protruded. This brings forth a damage locally to the bladder, the problem of which is serious.

Heretofore for avoiding the irregularity between the valve body and seat caused by eccentric positioning of the bladder, a guide member for vertically moving the valve body was used. However this guide member rather caused to increase liquid resistance in the liquid pipe.

Therefore one object of the present invention is, in the accumulator of the type in which a valve body is attached to the free end, to provide a valve device with which the valve body can closely engage the valve seat without any gap therebetween even when the bladder at random moves in an eccentric direction.

Another object of this invention is to provide means to protect the bladder from its being damaged caused by its eccentric positioning.

Thus the present invention is to provide a unique valve device in the bladder type accumulator which comprises a pressure vessel; to the bottom of which is a liquid pipe connected; a bladder enclosed in the pressure vessel; a valve body secured in the center of free end bottom of the bladder; a valve seat for receiving the valve body; mating means for closely engaging said valve body with the valve seat.

Said valve mating means includes the valve body and valve seat having a sealing face of semispherical configuration, or a guide member secured to the underside of the valve body with which the valve body is guided correctly towards the valve seat.

Other objects and features of the present invention will be more apparent with description proceeds with reference to accompanying drawings in which.

Figure 1:
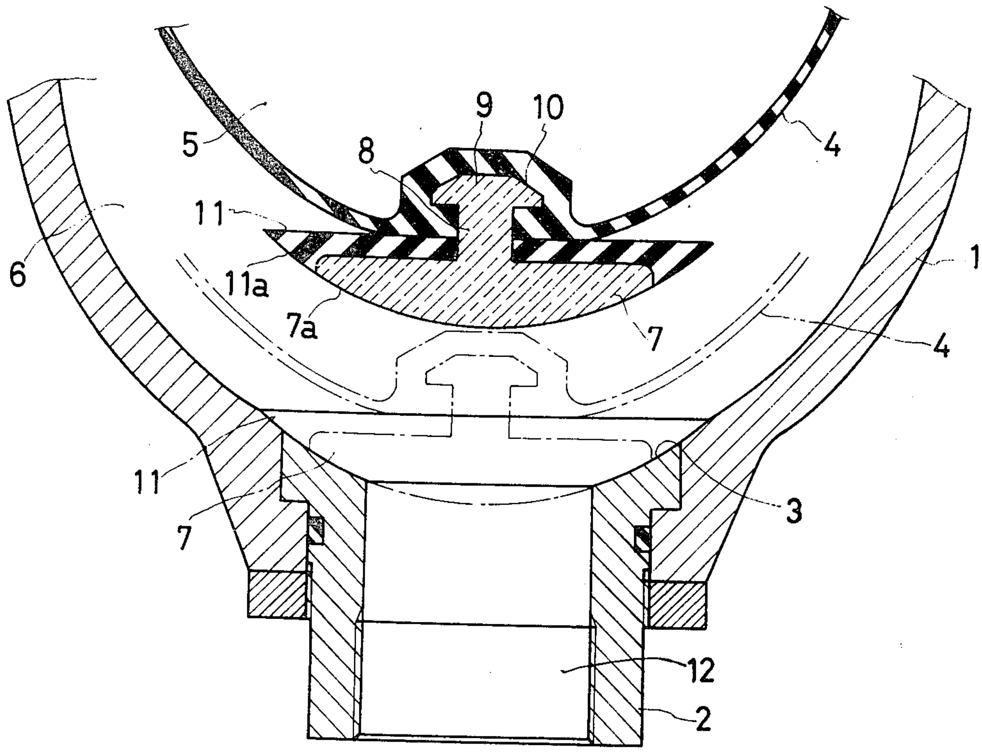
FIG. 1 is a fragmental cross section view of one embodiment of the present invention in which a valve body and valve seat are held in longitudinal concentric relation.

In FIG. 1 numeral 1 generally designates a pressure vessel made of metal withstandable to pressure applied. This pressure vessel 1, though its upper half is cut in drawings, is cylindrical, as a vessel generally used in accumulators, with its ends tapered to semispherial shape. 2 is a liquid pipe connected to the bottom of the pressure vessel 1, the lower end of which is communicated to hydraulic circuit (not shown). The top end inner periphery of the liquid pipe 2 is formed to a valve seat 3. The face of this valve seat 3 forms a part of spherical face. 4 is a bladder enclosed in the pressure vessel. This bladder 4 is made of natural or synthetic rubber and is of longitudinally elongated shape. The bladder 4, though its upper half is not shown in drawings, is as general bladders in the vessel of accumulators, the top end of which is secured to the vessel 1 airtightly. Thus the inside of the vessel 1 is partitioned to an air chamber 5 in which air or nitrogen gas is filled and a liquid chamber 6.

7 is a valve body mounted to the free end of the bladder 4 to be concentric with the liquid pipe 2. This valve body 7 has a stem 8 and its end is formed a head 9 and secured to the bladder 4 adhesively after pressingly inserted into a hole 10, preformed in the bladder 4. The underside seating face *7a* of the valve body 7 is made spherical to mate with said valve seat 3. 11 is an elastic auxiliary valve member interposed between the valve body 7 and bladder 4 and secured to the valve body 7 with vulcanized adhesion or the like. The underside 11*a* of this auxiliary valve member 11 is also formed spherical to be merged to the under face 7 of the valve body 7. 12 is a path in the liquid pipe for incoming and outgoing liquid.

Figure 2:
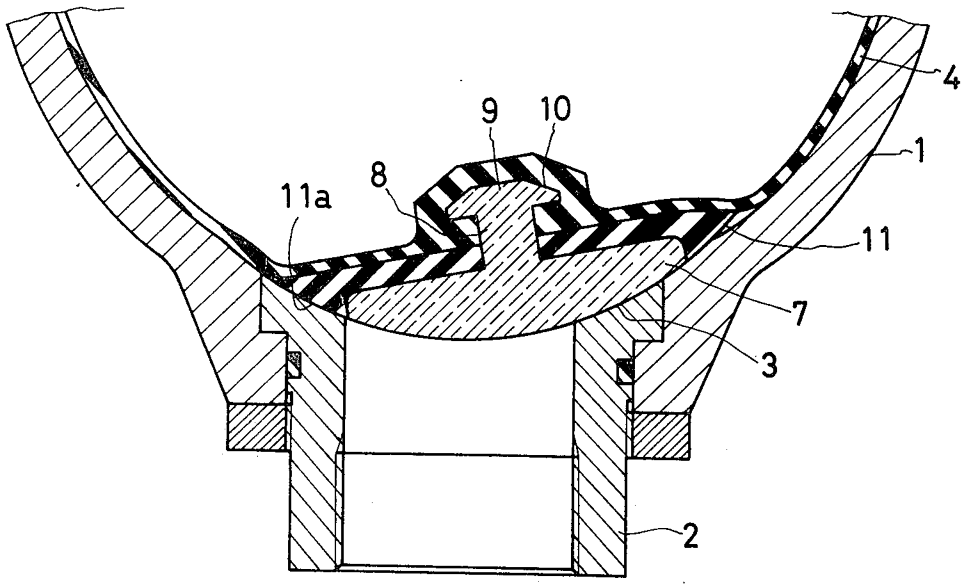
FIG. 2 is a fragmental cross section view showing the state that the valve body is slantly placed on the valve seat.

In operation, when pressure in the air chamber 5 becomes higher than that in the liquid chamber 6, the bladder 4 expands as shown by two-dot chain line in FIG. 1 and the valve body 7 comes to seat on the valve seat 3 of the liquid pipe 2. In case if the bladder 4 becomes eccentric as it swingingly expands and seats slantly on the valve seat 3 as seen in FIG. 2, yet the valve body 7 closely covers the seat 3 because the sealing faces of the valve body 7 and valve seat 3 are correspondingly spherical and engage to each other irrespective of the valve movement in any angle. Also if the valve body 3 comes to seat out of the seat 3 as seen in FIG. 2, the sealing face 11*a* of the valve body auxiliary member 11 becomes ultimately to close the seat 3.

Figure 3:
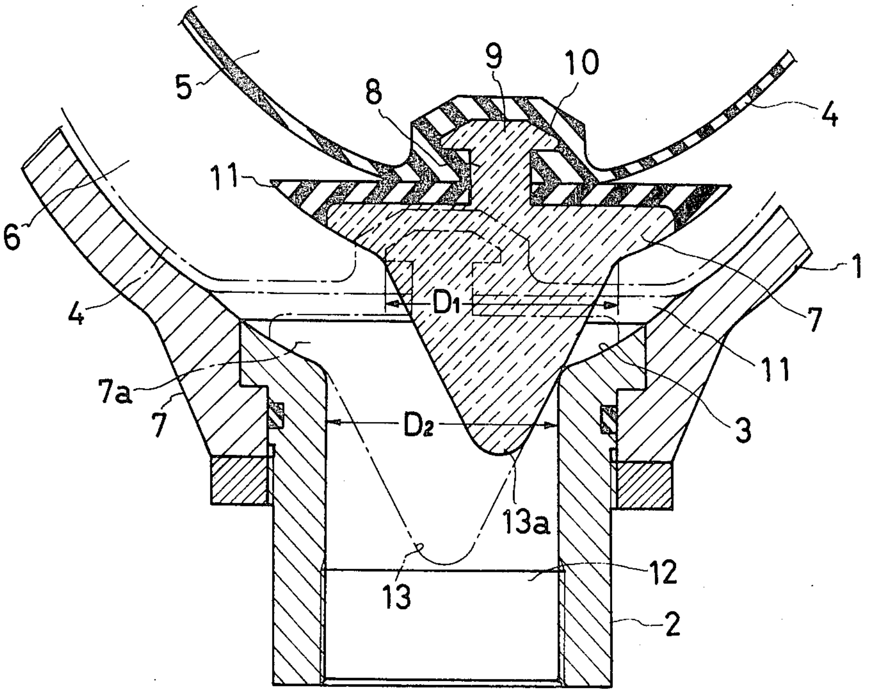
FIG. 3 is a fragmental cross section view of another embodiment of the present invention in which the valve body is provided with a guide member and the valve body is in eccentric position to the valve seat.

In FIG. 3, there is shown another embodiment. Therein beside the spherical sealing face *7a*, the valve body 7 has a conical shape guide member 13. The diameter $D_1$ of the conical base portion of this guide member 13 is somewhat smaller than the inside diameter $D_2$ of the liquide pipe 3.

When the bladder 4 expands, the tip end 13*a* of the guide member 13 gets into the path 12 of the liquid pipe 2. By virtue of this guide member 13, the valve body 7 can seat, while directing itself to be concentric to the valve seat 3, in the position as shown by two-dot chain line. In drawings shown is the case where the diameter $D_1$ of the conical base portion of the guide member 13 is appropriately a bit smaller than the inside diameter $D_2$ of the liquid pipe 2. However this conical base diameter $D_1$ may be made further smaller than relative to the inside diameter $D_2$ of the liquid pipe 2. In this instance, the guide valve member 13 would not always positively bring the valve body 7 to be concentric with the valve seat 3, nevertheless, it prevents the valve body 7 from being seated in too much out of the place.

Figure 4:
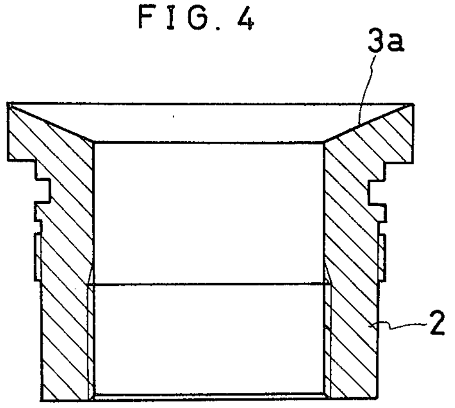
FIG. 4 is a modification of the liquid pipe in FIG. 3 the upper end of it is formed to a tapered valve seat.

FIG. 4 is a modification of the valve seat formed on top of the liquid pipe 2. In this, instead of the valve seat 3 formed in the top end of liquid pipe 2 as spherical face it may be made as frustro-cone shape 3*a*.

Same parts having same numerals in FIGS. 3 and 4 as those in FIGS. 1 and 2 have same functions.

The present invention is not limited only to the above. Any modification may be made, for example, instead of attachment of the auxiliary valve member 11 around the valve body body 7, the diameter of the valve body may be made larger as much as that of the auxiliary member 11 and also instead of the cone shape of the guide member 13, it may be made of semispherical shape, with which the object of the present invention will be also accomplished.

What is claimed is:

1. In a bladder type accumulator consisting of a vessel enclosing a bladder to be filled with pressure gas, a liquid pipe connected to the bottom of the vessel to be opposed to the free end of the bladder, the improvement characterized by the top end of the liquid pipe being formed as a valve seat to be opened and closed by the mating thereof by a spherical valve body which is secured to the bottom of the bladder and is larger in diameter than said valve seat to assure closure of said valve seat and to prevent extrusion of the bladder therebetween should said valve body eccentrically engage said valve seat.

2. In a bladder type accumulator as claimed in claim 1 the improvement further characterized in that the valve seat is spherical so as to closely mate with said valve body.

3. In the bladder type accumulator as claimed in claim 1 the improvement further characterized in that said valve body is comprised of a spherical seating face and a larger diameter, spherical elastic auxiliary valve member to augment the seating of the seating face and interposed between the bladder and said seating face.

4. In the bladder type accumulator as claimed in claim 1 the improvement further characterized in that a guide member smaller than the diameter of the liquid pipe is protruded from the center of the spherical valve body to guide said valve body towards the valve seat.

5. In a bladder type accumulator as described in claim 1 wherein said valve seat is frustroconical.

6. In a bladder type accumulator as described in claim 4 wherein said guide member is conical having a base smaller in diameter than the inner diameter of the liquid pipe.

7. In a bladder type accumulator as described in claim 4 wherein said guide member is hemispherical of a diameter smaller than the inner diameter of the liquid pipe.

8. A bladder type accumulator comprising: a pressure vessel; a liquid pipe connected to the bottom of the pressure vessel; a gas filled bladder enclosed in the pressure vessel; a valve seat formed in the top end of the liquid pipe, valve means larger than said valve seat secured to the bottom of the bladder, said valve means comprised of a spherical seating face of a diameter to mate said valve seat upon expansion of said bladder and an auxiliary valve to cooperate with said seating face to mate said valve seat if said valve means eccentrically engages the valve seat.

9. In a bladder type accumulator as described in claim 8 wherein said valve seat is spherical so as to be mated by the valve means.

10. In a bladder type accumulator as described in claim 8 wherein said valve seat is frustroconical so as to be mated by said valve means.

11. In an accumulator as claimed in claim 8 said seating face comprises a spherical surface formed around the periphery of a tapered guide member which protrudes from the center of said seating face to guide said seating face toward mating with the valve seat.

12. In a bladder type accumulator as described in claim 11 wherein said guide member is semispherical and of a diameter less than the inner diameter of the liquid pipe.

13. In the accumulator as claimed in claim 11, said guide member is of conical shape and its base diameter is slightly smaller than that of the inner diameter of the liquid pipe.

* * * * *